United States Patent
Dalla Corte

(10) Patent No.: US 9,161,656 B2
(45) Date of Patent: Oct. 20, 2015

(54) ESPRESSO COFFEE DISPENSING SYSTEM AND METHOD

(71) Applicant: Paolo Dalla Corte, Novate Milanese (IT)

(72) Inventor: Paolo Dalla Corte, Novate Milanese (IT)

(*) Notice: Subject to any disclaimer, the term of this patent is extended or adjusted under 35 U.S.C. 154(b) by 22 days.

(21) Appl. No.: 13/873,992

(22) Filed: Apr. 30, 2013

(65) Prior Publication Data

US 2013/0302481 A1    Nov. 14, 2013

(30) Foreign Application Priority Data

May 8, 2012  (IT) .............................. MI2012A0768

(51) Int. Cl.
*A47J 31/42*    (2006.01)
*A47J 31/52*    (2006.01)

(52) U.S. Cl.
CPC . *A47J 31/42* (2013.01); *A47J 31/52* (2013.01)

(58) Field of Classification Search
CPC .................................. A47J 31/52; A47J 31/42
USPC ........... 426/231; 99/280, 283, 302 R, 329 RT, 99/286, 285, 316, 538, 289 R
See application file for complete search history.

(56) References Cited

U.S. PATENT DOCUMENTS

| | | | | |
|---|---|---|---|---|
| 4,841,849 A | * | 6/1989 | Shimomura et al. | 99/282 |
| 5,183,998 A | * | 2/1993 | Hoffman et al. | 219/492 |
| 5,287,795 A | * | 2/1994 | Enomoto | 99/280 |
| 5,307,733 A | * | 5/1994 | Enomoto | 99/280 |
| 6,324,770 B2 | * | 12/2001 | Moon et al. | 34/577 |
| 6,672,200 B2 | * | 1/2004 | Duffy et al. | 99/283 |
| 7,201,098 B2 | * | 4/2007 | Wang | 99/286 |
| 7,322,275 B2 | * | 1/2008 | Lussi | 99/281 |
| 7,654,191 B2 | * | 2/2010 | Greenwald et al. | 99/275 |
| 8,196,776 B2 | * | 6/2012 | Doglioni Majer | 222/1 |
| 8,826,803 B2 | * | 9/2014 | Mazzer | 99/280 |
| 2008/0050480 A1 | * | 2/2008 | Doglioni Majer | 426/231 |
| 2009/0095165 A1 | * | 4/2009 | Nosler et al. | 99/289 R |
| 2010/0011975 A1 | * | 1/2010 | Mazzer | 99/538 |
| 2011/0212231 A1 | * | 9/2011 | McLaughlin | 426/231 |
| 2011/0283889 A1 | * | 11/2011 | Con et al. | 99/286 |
| 2013/0087050 A1 | * | 4/2013 | Studor et al. | 99/285 |
| 2014/0261853 A1 | * | 9/2014 | Carnevale et al. | 141/1 |
| 2014/0272025 A1 | * | 9/2014 | Wheeler | 426/231 |

FOREIGN PATENT DOCUMENTS

| | | |
|---|---|---|
| DE | 202009009496 U1 | 11/2009 |
| EP | 1584273 A2 | 10/2005 |
| WO | 2010085850 A1 | 8/2010 |

OTHER PUBLICATIONS

Search Report dated Feb. 8, 2013 from Italian priority application MI2012A 000768.

* cited by examiner

*Primary Examiner* — Dana Ross
*Assistant Examiner* — Jimmy Chou
(74) *Attorney, Agent, or Firm* — Novak Druce Connolly Bove + Quigg LLP

(57) ABSTRACT

An espresso coffee dispensing system including at least one espresso coffee production machine including at least one espresso coffee dispensing unit, the unit comprising a filter for containing ground coffee powder and hot water feeder; a coffee grinder having an exit port for coffee powder and a temperature sensor disposed in proximity to the exit port to measure the temperature value of the ground coffee powder leaving the port; electronic controller associated with the coffee grinder to determine the water temperature value.

13 Claims, 1 Drawing Sheet

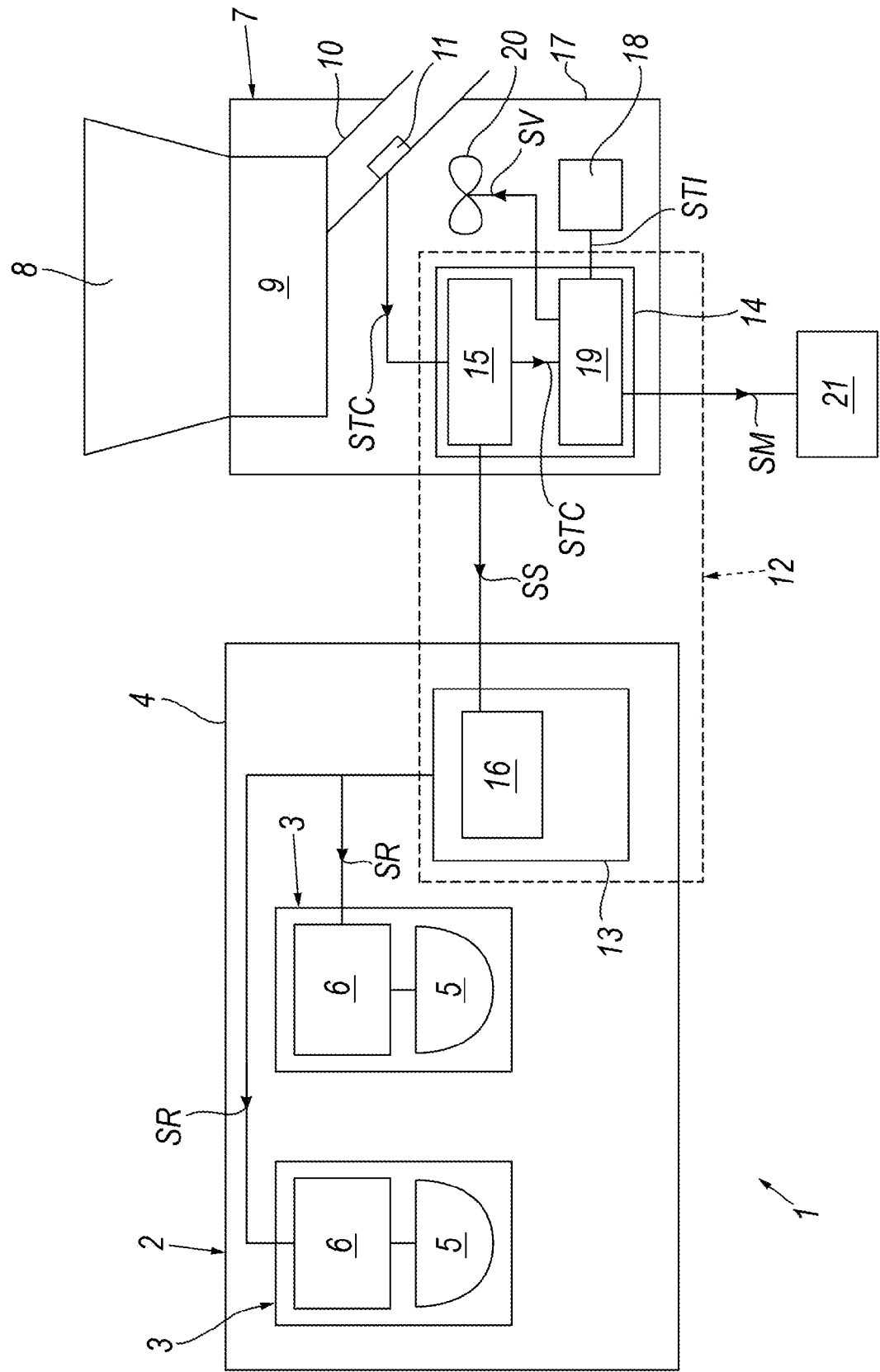

ESPRESSO COFFEE DISPENSING SYSTEM AND METHOD

FIELD OF THE INVENTION

The present invention relates to an espresso coffee dispensing system and method.

In particular, the present invention finds application in the professional preparation of espresso coffee in bars, restaurants or the like.

BACKGROUND OF THE INVENTION

Once roasted and ground, coffee is known to be extremely sensitive to the conditions of the environment in which it is located, in the sense that they can considerably influence the result of the beverage obtained in terms of taste and quality.

One of the conditions which mostly influence the beverage quality is the temperature of the ground coffee powder at the moment in which the hot water flow passes through it on preparation.

The temperature of the ground coffee powder can firstly vary with varying temperature of the environment in which the coffee grinder operates.

Of even greater influence however is the heating effect produced by the grinding itself. In fact, such machines generate on the coffee beans a considerable friction causing the powder to undergo heating. Sometimes the machine action itself can cause overheating of the coffee powder.

Examples of known espresso coffee dispensing systems can be seen in WO 2010/085850, DE 20 2009 009496 and EP 1 584 273.

The effect of temperature on the coffee powder is reflected in the quality of the beverage obtained.

In this respect, it is found that the higher the coffee powder temperature, the more the extraction time (i.e. the time in which a predetermined hot water quantity passes through the coffee powder) decreases. In other words, extraction becomes quicker.

This determines less effective extraction of the coffee aromatic components. Moreover, the cream obtained is more unstable, deteriorating rapidly.

This causes a further aroma loss from the beverage, as the cream helps to maintain the aromatic substances within the beverage.

SUMMARY OF THE INVENTION

In this situation, the technical aim at the basis of the present invention is to propose an espresso coffee dispensing system and method which overcome the aforestated drawbacks of the known art.

A particular object of the present invention is to provide an espresso coffee dispensing system and method which enable espresso coffee to be prepared of high and constant quality.

The stated technical aim and the specified object are substantially attained by an espresso coffee dispensing system and method comprising the technical characteristics stated on one or more of the accompanying claims.

Further characteristics and advantages of the present invention will be more apparent from the indicative and therefore non-limiting description of a preferred but non-exclusive embodiment of an espresso coffee dispensing system and method, as illustrated in the accompanying FIG. 1 which shows a schematic representation of an espresso coffee dispensing system in accordance with the present invention.

BRIEF DESCRIPTION OF THE DRAWING

FIG. 1 shows overall an espresso coffee dispensing system according to the present invention.

DETAILED DESCRIPTION OF THE PREFERRED EMBODIMENTS

With reference to the accompanying FIGURE (FIG. 1), the reference numeral 1 indicates overall an espresso coffee dispensing system according to the present invention.

The system 1 comprises at least one machine 2 for producing espresso coffee. The machine 2 is preferably of the professional type used, for example, in bars, restaurants and the like.

The machine 2 comprises at least one espresso coffee dispensing unit 3. Preferably, the machine 2 comprises a plurality of mutually separate dispensing units 3. The dispensing units 3 are housed in a single box casing 4 of the machine 2.

Each dispensing unit 3 comprises a filter 5 for containing a predetermined quantity of ground coffee powder and hot water feed means 6 to cause a flow of hot water to pass through the filter 5 in order to prepare the espresso coffee.

The feed means 6 comprise a boiler (not shown) for heating the water to a desired temperature and a pump (not shown) for delivering the water at a desired pressure which, typically, is of 9 bar.

The feed means 6 of each dispensing unit 3 can be controlled independently of each other. In other words, at least the temperature of the water fed to each dispensing unit 3 can be controlled separately.

The system 1 also comprise at least one coffee grinder 7 functionally connected to the machine 2. Preferably, the system 1 comprises a plurality of coffee grinders 7 for producing ground coffee powder of different types.

Each coffee grinder 7 (represented only schematically) comprises a container 8 for containing coffee beans, and grinding wheels 9 for grinding the coffee beans to obtain the coffee powder. A box casing 17 encloses the grinding wheels 9 and the other non-described components.

An exit port 10 for the newly ground powder is disposed downstream of the grinding wheels 9.

Preferably, the coffee grinders 7 do not comprise a coffee powder collection tray, hence the coffee grinder 7 delivers only the quantity of coffee powder required to provide the desired beverage at the moment of preparation.

Advantageously, the machine 2 and the coffee grinder 7 are separate and are separated from each other.

Each coffee grinder 7 also comprises a temperature sensor 11 in a position corresponding with the exit port 10.

The temperature sensors 11 of the coffee grinders 7 generate respective temperature signals "STC" representative of the temperature of the coffee powder leaving the respective exit ports 10.

For example, the temperature sensors 11 can be thermoresistors of PT100 or PT1000 type. Alternatively, the temperature sensors 11 can be of any other suitable type.

The system 1 also comprises electronic control means 12 functionally associated with the coffee grinder 7 to receive the respective coffee temperature signals "STC" and functionally associated with the machine 2 to generate respective regulating signals "SR" and send them to the dispensing units 3. The regulating signals "SR" are representative of the desired water temperature.

As will be clearer hereinafter, the regulating signals "SR" are generated on the basis of the coffee temperature signals "STC" arriving from the temperature sensors 11.

Advantageously, the electronic control means 12 comprise a first processor unit 13 disposed inside the machine 2 and a second processor unit 14 disposed inside the coffee grinder 7.

The first 13 and the second processor unit 14 are functionally connected together.

For example, the first 13 and the second processor unit 14 are microprocessor units.

The electronic control means 12 comprise a comparison element (or subunit) 15 which receives the coffee temperature signals "STC" and compares them with at least one preset reference temperature value. A plurality of different reference values can be set depending on the type of coffee used.

The comparison element 15 is preferably disposed in the second processor unit 14. In alternative embodiments, the comparison element 15 is disposed in the first processor unit 13.

Following the said operation, the comparison element 15 generates corresponding difference signals "SS" which represent the difference between each measured value of the temperature of the coffee leaving the coffee grinder 7 and the reference value.

The electronic control means 12 also comprise a regulating element (or subunit) 16 functionally connected to the comparison element 15 to receive the difference signals "SS".

The regulating element 16 is preferably disposed in the first processor unit 13. In alternative embodiments, the regulating element 16 is disposed in the second processor unit 14.

The regulating element 16 is also functionally connected to the dispensing units 3 to generate a corresponding number of said regulating signals "SR" and send them to said units. In greater detail, the regulating signals "SR" are sent to the hot water feed means 6 such as to set the desired water temperature for each dispensing unit 3.

As stated, each dispensing unit 3 can be controlled independently. Moreover, advantageously, each coffee grinder 7 is functionally associated unequivocally with one or more of the dispensing units 3.

In this manner, water temperature regulation is implemented precisely on that dispensing unit 3 for which the coffee has just been ground.

A further temperature sensor 18 is contained inside the box casing 17 of each coffee grinder 7, preferably distant from the coffee powder exit port 10.

Advantageously, the further temperature sensor 18 is disposed at the second processor unit 14.

Each further temperature sensor 18 generates an internal temperature signal "STI" representative of the temperature value measured in the interior of the compartment of the respective coffee grinder 7.

Each further temperature sensor 18 is functionally associated with the electronic control means 12 to send the respective internal temperature signal "STI" thereto.

In this respect, the electronic control means 12 comprise a surveillance element (or subunit) 19 functionally connected to each further temperature sensor 18 to receive the respective internal temperature signal "STI".

The surveillance element 19 is also functionally connected to each further temperature sensor 18 to receive the respective coffee temperature signals "STC".

The surveillance element 19 senses when the measured coffee powder temperature value exceeds a threshold coffee temperature value and at the same time the measured internal temperature value is less than a threshold internal temperature value.

In that case the surveillance element 19 generates a maintenance signal "SM" representative of the need to replace the grinding wheels 9 of the coffee grinder 7 in question. This maintenance signal "SM" can be displayed by suitable display means 21, such as a liquid crystal screen.

The surveillance element 19 also generates a ventilation signal "SV" and sends it to a fan 20 inside the box casing 17 of the coffee grinder 7, to activate it when the measured internal temperature value exceeds the threshold internal temperature value.

The invention also provides a method for dispensing espresso coffee.

This method comprises the step of grinding a predetermined quantity of coffee. This step is implemented by the coffee grinder 7. The coffee powder quantity is placed in the filter 5 of the machine 1.

The method also comprises the step of heating a predetermined water quantity to the desired temperature and bringing the water to the desired pressure which, as seen, is preferably 9 bar. These steps are implemented by the feed means 6.

The water is made to pass through the quantity of ground coffee powder, by making it pass through the filter 5.

According to the present invention, the method comprises the step of measuring a ground coffee powder temperature. This step is implemented by the temperature sensor 11. In particular, the value of the temperature of the powder leaving the coffee grinder 7 is measured. In that case the temperature measurement step and the coffee grinding step are simultaneous.

The desired temperature to which to heat the water is determined on the basis of the measured value of the coffee powder temperature. This step is conducted by the electronic control means 12.

In particular, the water temperature determination step is achieved by comparing the measured temperature value with the reference temperature value. In that manner, the difference between the measured temperature value and the reference temperature value is determined. This step is conducted by the comparison element 15 of the electronic control means 12.

Having determined this difference, the value of the water temperature is determined.

In particular, a corrective temperature value is determined, to be added to a preset water temperature value. This corrective value is calculated as a function of the value of said difference.

This step is conducted by means of the regulating element 16 of the electronic control means 12.

In detail, the corrective temperature value is positive when the difference is negative, whereas it is negative when the difference is positive.

As an example, the corrective value is 0.5° C. for each 5° C. of the difference value.

In effect, any temperature variation in the ground coffee powder is compensated by modifying the temperature of the water with which the extraction takes place.

The invention so described attains the specified purpose.

Consequently, the extraction time is maintained constant, hence maintaining the quality of the obtained beverage constant.

The invention claimed is:

1. An espresso coffee dispensing system, comprising:
   at least one espresso coffee production machine comprising at least one espresso coffee dispensing unit, the espresso coffee dispensing unit comprising at least one filter for containing ground coffee powder and means for feeding hot water through the filter for brewing the coffee;
   at least one coffee grinder having an exit port for the ground coffee powder and at least one temperature sensor at the exit port for generating a ground coffee temperature signal representative of the temperature of the ground coffee powder leaving from the exit port;

electronic control means communicatively coupled with the coffee grinder exit port temperature sensor for receiving the coffee temperature signal from the temperature sensor and generating a regulating signal as a function of the coffee temperature signal; and the electronic control means communicatively coupled with the hot water feed means to send the regulating signal to the hot water feed means to regulate the temperature of the hot water fed by the hot water feed means through the filter in response to the ground coffee temperature signal.

2. The system as claimed in claim 1, wherein the electronic control means comprise a comparison element arranged to receive the ground coffee temperature signal and to compare the ground coffee temperature signal with at least one reference temperature value; the comparison element generating a difference signal representative of the difference between the measured temperature value and the reference temperature value.

3. The system as claimed in claim 2, wherein the electronic control means comprise a regulating element functionally connected to the comparison element to receive the difference signal and communicatively coupled to the hot water feed means to generate and send the regulating signal.

4. The system as claimed claim 1, wherein the electronic control means comprise a first processor unit associated with the espresso coffee production machine and a second processor unit associated with the coffee grinder; the first processor unit and the second processor unit being functionally connected together.

5. The system as claimed claim 1, wherein the espresso coffee production machine comprises a plurality of espresso coffee dispensing units and also comprises a plurality of coffee grinders; each coffee grinder being functionally associated unequivocally with one or more of the espresso coffee dispensing units.

6. The system as claimed claim 1, wherein the coffee grinder comprises a containing box casing and a further temperature sensor disposed inside the box casing to measure the temperature of interior compartment space defined by the box casing.

7. The system as claimed in claim 6, wherein the further temperature sensor generates an internal temperature signal representative of the measured temperature value inside the box casing and is communicatively coupled with the electronic control means to send the internal temperature signal.

8. The system as claimed in claim 7, wherein the electronic control means comprise a surveillance element communicatively coupled to the temperature sensor and to the further temperature sensor to respectively receive the coffee temperature signal and said internal temperature signal;

the surveillance element generating a maintenance signal representative of the need to replace the grinding wheels of the coffee grinder if the coffee temperature value exceeds a threshold coffee temperature value and the measured internal temperature value is less than a threshold internal temperature value.

9. The system as claimed claim 1, wherein the espresso coffee production machine is separate and is separated from the coffee grinder.

10. An espresso coffee dispensing method for using the system of claim 1, comprising the steps of:

grinding a predetermined quantity of coffee powder in the coffee grinder;

causing a predetermined quantity of hot water at a predetermined temperature to pass through the quantity of ground coffee powder in said dispensing unit;

measuring the temperature of the predetermined quantity of ground coffee powder using the temperature sensor;

using the electronic control means to regulate the temperature of the predetermined quantity of hot water in response to the temperature sensor.

11. The method as claimed in claim 10, wherein the step of determining the water temperature comprises the step of comparing the measured temperature value with a reference temperature value to determine the difference between the measured temperature value and the reference temperature value.

12. The method as claimed in claim 11, wherein the step of determining the water temperature comprises the step of determining a corrective temperature value to be added to a water reference temperature value as a function of the value of the difference.

13. The method as claimed in claim 12, wherein the corrective temperature value is positive/negative when the difference is negative/positive.

* * * * *